(12) United States Patent
Tojo et al.

(10) Patent No.: US 7,808,365 B2
(45) Date of Patent: Oct. 5, 2010

(54) PRESSURE SENSOR

(75) Inventors: Hirofumi Tojo, Tokyo (JP); Masayuki Yoneda, Tokyo (JP); Tomohisa Tokuda, Tokyo (JP)

(73) Assignee: Yamatake Corporation, Tokyo (JP)

( * ) Notice: Subject to any disclaimer, the term of this patent is extended or adjusted under 35 U.S.C. 154(b) by 293 days.

(21) Appl. No.: 12/035,000

(22) Filed: Feb. 21, 2008

(65) Prior Publication Data
US 2008/0204185 A1   Aug. 28, 2008

(30) Foreign Application Priority Data
Feb. 28, 2007   (JP) .............................. 2007-050822

(51) Int. Cl.
*H01C 10/10* (2006.01)
(52) U.S. Cl. .............................. 338/42; 338/2; 73/754; 438/478
(58) Field of Classification Search .................. 338/2, 338/22 SD, 42; 73/754, 715–727; 438/478, 438/479, 652, 689
See application file for complete search history.

(56) References Cited

U.S. PATENT DOCUMENTS

| 3,772,628 | A |   | 11/1973 | Underwood |        |
|-----------|---|---|---------|-----------|--------|
| 5,142,912 | A | * | 9/1992  | Frische   | 73/702 |
| 5,220,305 | A |   | 6/1993  | Nagatsu   |        |
| 5,412,993 | A |   | 5/1995  | Ohtani    |        |
| 5,432,372 | A |   | 7/1995  | Ohtani    |        |
| 5,581,226 | A | * | 12/1996 | Shah      | 338/42 |
| 6,211,772 | B1| * | 4/2001  | Murakami et al. | 338/42 |
| 2003/0217603 | A1 | | 11/2003 | Ishio |        |

FOREIGN PATENT DOCUMENTS

| EP | 0427179 A2  | 5/1991  |
| JP | 05-283712 A | 10/1993 |
| JP | 09-126922 A | 5/1997  |
| JP | 2000-171318 A | 6/2000 |
| JP | 2002-277337 A | 9/2002 |

OTHER PUBLICATIONS

Extended European Search Report dated Jun. 1, 2010 for EP 2008-250656: "Semiconductive diaphragm-type pressure sensor" (corresponding EP application to the instant U.S. Appl. No. 12/035,000.

* cited by examiner

*Primary Examiner*—Kyung Lee
(74) *Attorney, Agent, or Firm*—McDermott Will & Emery LLP

(57) ABSTRACT

A diaphragm is formed at a predetermined location of a sensor chip made of semiconductor material, and a sensor gauge for differential pressure or pressure sensing-use is provided on the sensor chip that includes at least the diaphragm. The sensor gauge has a plurality of sensor gauges synergistically forming a bridge circuit, and are connected to one another with semiconductor resistors, the semiconductor resistors and the sensor gauges are covered with an insulating film, and the number of contact holes, passing through a portion of the insulating film, for electrode line-out use for forming contacts electrically connected to the semiconductor resistors does not exceed the number of sensor gauges.

1 Claim, 5 Drawing Sheets

PRESSURE SENSOR

CROSS-REFERENCE TO RELATED APPLICATION

The present application claims priority under 35 U.S.C. §119 to Japanese Patent Application No. 2007-050822 filed on Feb. 28, 2007. The contents of the application is incorporated herein by reference in its entirety.

TECHNICAL FIELD

The present invention relates to a pressure sensor suitable for measuring absolute pressure, gauge pressure and differential pressure.

BACKGROUND OF THE INVENTION

For example, a pressure sensor that is widely used is comprised of a diaphragm formed over a portion of a semiconductor chip and a piezoresistive element arranged in a bridge shape on the diaphragm, and pressure on a medium to be measured is sensed by converting the displacement of the diaphragm, corresponding to the pressure on the medium to be measured, into a change in resistance of the piezoresistive element (see Japanese Unexamined Patent Application Publication No. 2002-277337 (page 2, FIG. 2) ("JP '337"), for example).

In a sensor chip of a pressure sensor having a semiconductor piezo element such as cited in JP '337, and particular for a sensor chip in which a resistive elements configure a bridge circuit, aluminum or other type of metal wiring is disposed on the structure thereof, and the number of contacts between the resistance and the wiring is twice the number of resistors. However, in the case such as where heat is applied to a pressure sensor having this type of structure, (thermal stress) is due to the different coefficients of linear expansion among the aluminum wiring, insulating film and semiconductor resistances is generated in each of these constitutional elements, causing the zero point of the sensor output to shift.

On the other hand, on the (110) face of a 300 μm-thick silicon substrate of the pressure sensor cited in Japanese Unexamined Patent Application Publication No. H9-126922 (hereafter referred to as "JP '922") a piezo element is formed by the thermal dispersion of boron, and electrode wiring is formed from diffused resistance in a manner similar to that by which the piezoresistive element is formed. Then, an aluminum layer is formed on the (110) face of the silicon substrate by means of an electron beam evaporation method, and this aluminum layer is patterned into a predetermined shape by means of a photolithographic process to form an electrode pad. Moreover, anisotropic etching with potassium hydroxide is performed on the rear surface side of the (110) face of the silicon substrate to form a diaphragm.

More specifically, in the pressure sensor cited in JP '922, as is evident from the drawings in that document, the (110) face of the silicon monocrystalline substrate is used to form the diaphragm and diffused resistance, and the formative direction of the piezoresistive element is aligned in approximately the same direction as the <111> orientation on the (110) face of the silicon substrate. Moreover, the wiring made from diffusion resistance has a configuration that faces only the <100> orientation and the <110> orientation on the (110) face of the silicon substrate. Having such a configuration, the wiring is provided with pressure sensitivity in an attempt to solve only the challenge of how to improve sensitivity, even if slightly. Thus, the pressure sensor cited in JP '922 has high pressure sensitivity, but does not have a configuration for solving the problem of achieving insusceptibility to micro-stress from the wiring and other stresses on the sensor.

Additionally, in the pressure sensor cited in JP '922, the semiconductor resistance is not protected by an insulating film, and therefore environmental durability is extremely poor, and high precision is not achieved due the large affect of noise components and drift in the sensor output.

An object of the present invention is to provide a pressure sensor having excellent environmental durability, high pressure sensitively, and being unaffected by micro-stress from the wiring and the like on the sensor.

SUMMARY OF THE INVENTION

The pressure sensor of the present invention includes a diaphragm formed at a predetermined location of a sensor chip made of semiconductor material, and a sensor gauge for differential pressure or pressure sensing-use provided on the sensor chip that includes at least the diaphragm; wherein the sensor gauge has a plurality of sensor gauges synergistically forming a bridge circuit, the sensor gauges being connected to one another with semiconductor resistors, and the semiconductor resistors and the sensor gauges being covered with an insulating film, and the number of contact holes, passing through a portion of the insulating film, for electrode line-out use for forming contacts electrically connected to the semiconductor resistors does not exceed the number of sensor gauges.

Providing a pressure sensor with this type of configuration enables a reduction in the number of areas configured from metals, an oxide film and semiconductor material, each of which having different coefficients of linear expansion, in regions corresponding to the contact holes, and enables the pressure sensor to be made insusceptible to micro-stress from wiring and the like on the sensor. Moreover, by covering the semiconductor resistors and sensor gauges with an insulating film, a pressure sensor having excellent environmental durability can be realized.

Another embodiment of the pressure sensor the present invention is characterized as above, wherein:

the sensor chip is made from silicon, the sensor chip being formed on the (100) face, the sensor gauges being formed in the <110> orientation, and the semiconductor resistors being formed in the <100> orientation.

With a sensor chip being made of silicon, by forming the sensor gauges in the <110> orientation having sensitivity to stress generated when pressure is applied to the diaphragm and forming the semiconductor resistors in the <100> orientation having no sensitivity to this stress, a pressure sensor can be realized having high pressure sensitivity, insusceptibility to micro-stress from wiring and the like on the sensor, and excellent environmental durability.

With the present invention, a pressure sensor can be provided having excellent environmental durability, high pressure sensitively, and being unaffected by micro-stress from the wiring and the like on the sensor.

DESCRIPTION OF THE INVENTION

Figure 1:
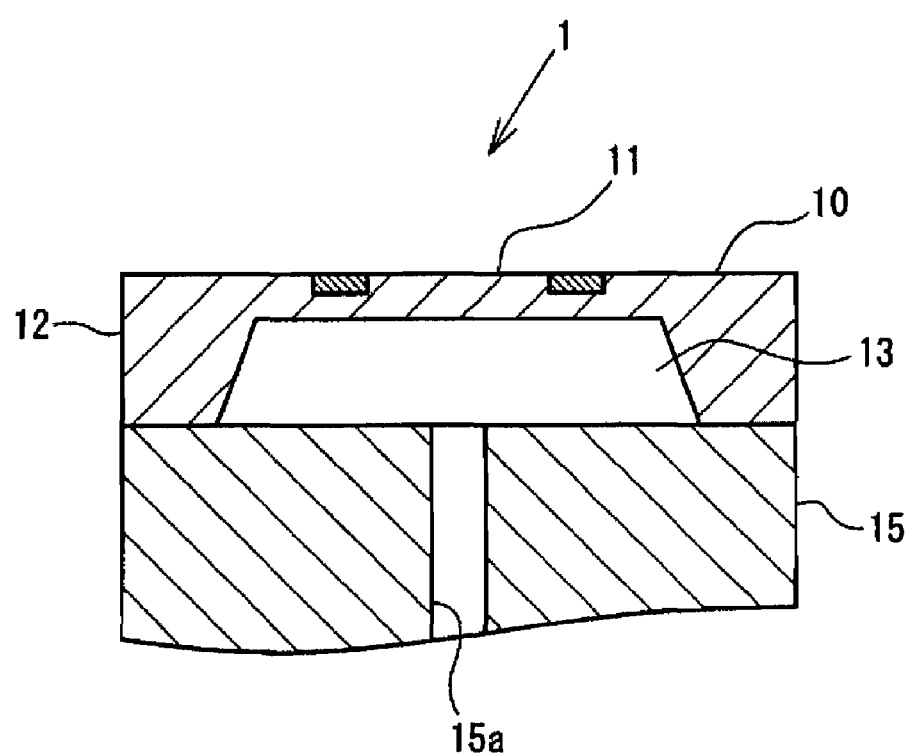
FIG. 1 is a cross-sectional view showing a simplified configuration of a pressure sensor in an embodiment of the present invention.
Figure 2:
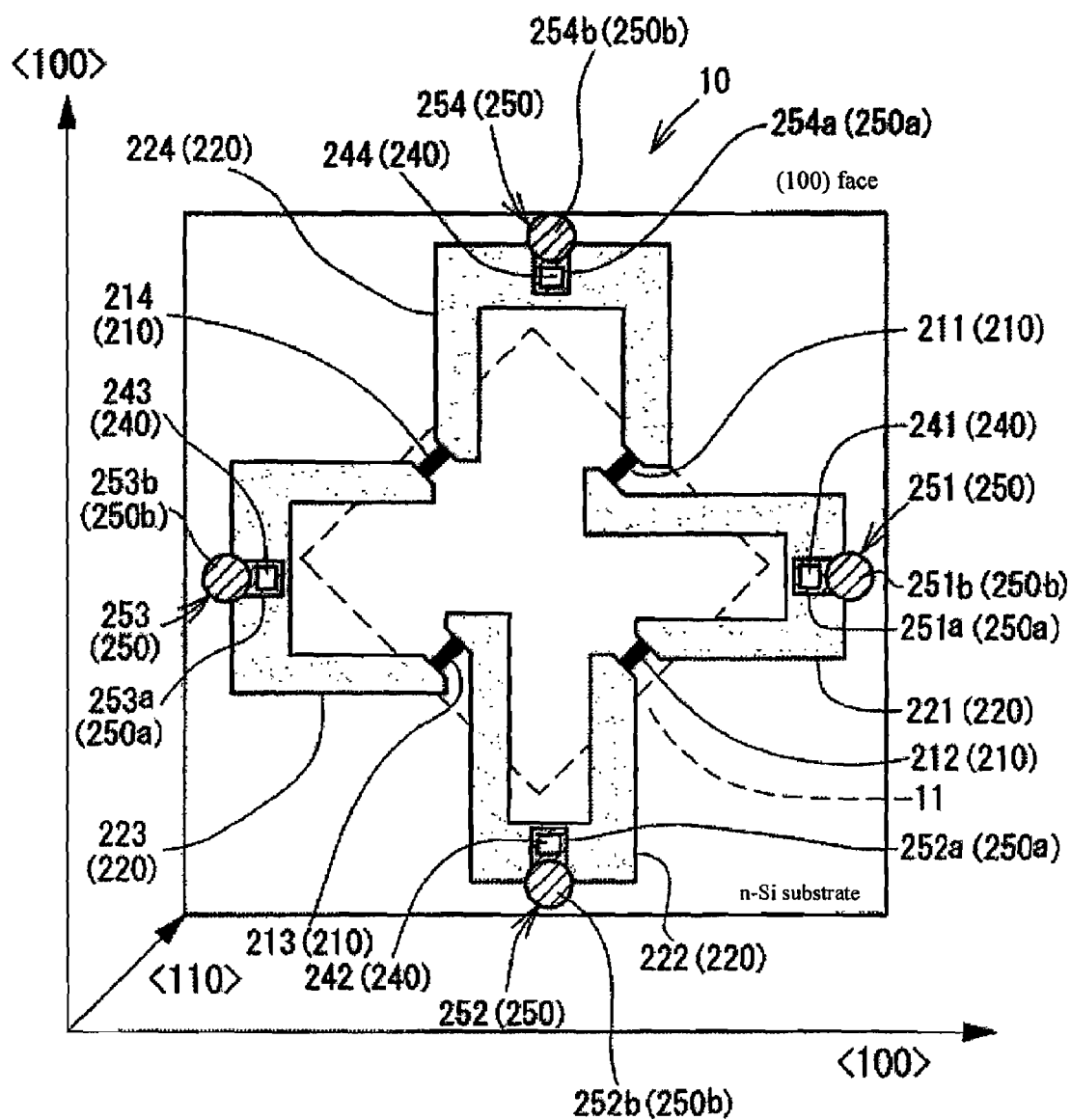
FIG. 2 is a plan view of the pressure sensor shown in FIG. 1.

A pressure sensor 1, in an embodiment of the present invention, is described below with reference to drawings. The pressure sensor 1 in a this embodiment of the present invention has a square-shaped sensor chip 10 comprised of n-type monocrystalline Si having a (100) crystal plane orientation as is shown in FIGS. 1 and 2. Furthermore, the descriptions of the present embodiment and a subsequent embodiments use only "pressure" terminology, and needless to say, these embodiments also include the case in which different pressures are applied to both faces of the diaphragm and the pressure difference measured.

The sensor chip 10 is comprised of a square-shaped diaphragm 11 formed at a predetermined location on the chip surface and a thick-walled portion 12 forming the outer periphery of the sensor chip 10 and surrounding the diaphragm 11. Then, a square-shaped recessed portion 13 is formed at the center of the rear face of the sensor chip 10 as a result of the formation of the diaphragm 11, and the thick-walled portion 12 is anodically bonded to a pedestal 15. Using Pyrex™ glass, ceramic material or the like, the pedestal 15 is formed into a prismatic body having approximately the same size as the sensor chip 10. Moreover, in the pedestal 15, a pressure conducting path 15a that guides the pressure on the medium to be measured is formed on the rear side of the diaphragm 11.

The diaphragm 11 is formed at an angle of approximately 45° with respect to the sensor chip 10 so that the edge thereof is perpendicular to the diagonal of the sensor chip 10 in the plan view shown in FIG. 2. Then, in the vicinity of the peripheral edges of the diaphragm surface, four sensor gauges 210 (211 to 214) for sensing pressure and acting as piezo regions are formed at locations parallel to the diagonals of the sensor chip 10. Namely, these sensor gauges 211 to 214 are formed on the (100) face of the sensor chip 10 in the <110> orientation, at which the piezoresistance coefficient becomes a maximum.

Figure 3:
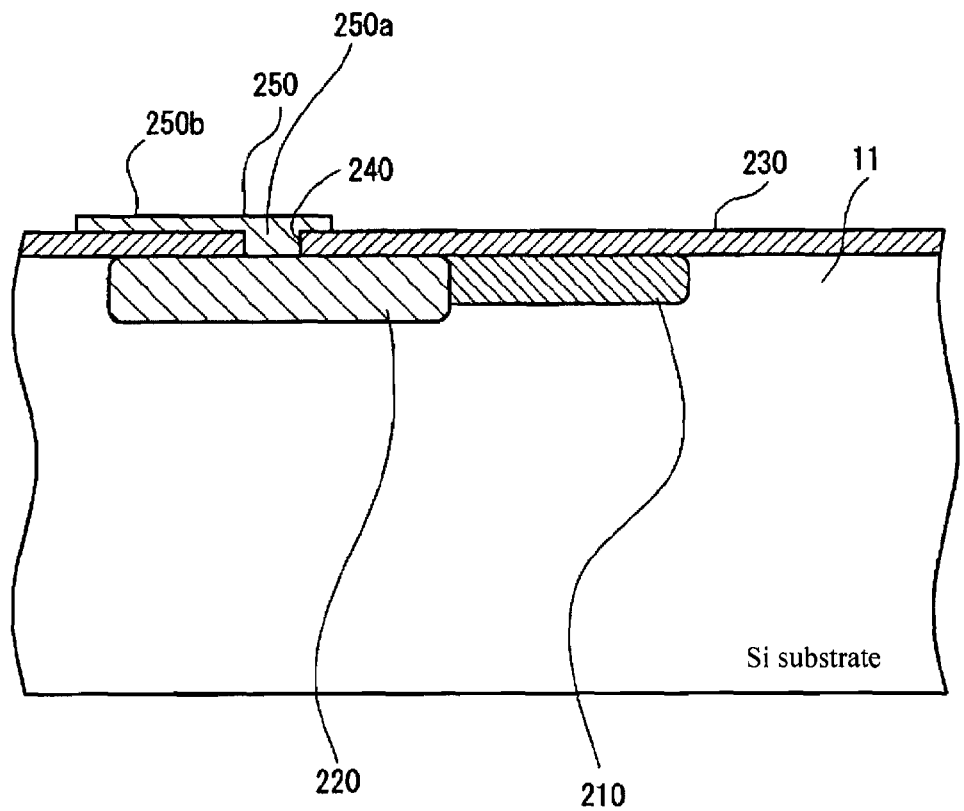
FIG. 3 is cross-sectional view showing a region in the vicinity of a contact hole of the pressure sensor shown in FIG. 1.

Moreover, between each of the plurality of sensor gauges 210 that form a bridge circuit, a diffused resistive wiring 220 (221 to 224) is connected, and the sensor gauges 210 and the diffused resistive wiring 220 are covered, with the exception of some contact holes 240 (241 to 244) (to be described later), by an oxide insulating film 230 shown in FIG. 3.

Furthermore, the diffused resistive wiring 220 is shown in FIG. 2 as being wide, and has a low actual resistive value, while the sensor gauges 210 are shown in FIG. 2 as being narrow, and have a high actual resistive value. Accordingly, the diffused resistive wiring 220 and the sensor gauges 210 synergistically form the bridge circuit.

Then, at the respective predetermined locations of each diffused resistive wiring 221 to 224 of the bridge circuit formed by the combination of the sensor gauges 210 and the diffused resistive wiring 220, contact holes 240 (241 to 244), passing through a portion of the oxide layer 230, for forming electrode line-out contacts 250 (251 to 254) from the diffused resistive wiring 220 are formed correspondingly. Furthermore, in the case of the present embodiment, these contact holes 240 are comprised of two contact holes, 242 and 244, for applying electric power to the bridge circuit, and two contact holes, 241 and 243, for receiving outputs from the bridge circuit, for a total of four contact holes, and the number of contact holes 240 does not exceed the number of sensor gauges 211 to 214.

As described above, the contacts 250 (251 to 254) formed in correspondence with each contact hole 240 are made of aluminum. Then, as shown in FIG. 3, a portion of the contacts 250, embedded parts 250a (251a to 254a), are formed so as to fill the contact holes and the remaining portions thereof are formed as contact pads 250b (251b to 254b) on the oxide film. Then, the diffused resistive wiring 220 and the contact pads 250b are made electrically conductive by the contacts 250, and wires (not shown) are bonded to the contact pad 250b to supply electric power to the bridge circuit and to receive output from the bridge circuit.

Furthermore, in the pressure sensor 1 shown in FIG. 2, four wide diffused resistive wires 221 to 224 having an irregular squared U-shape are arranged on the top surface of the pressure sensor chip, and both ends of each of the diffused resistive wires 221 to 224 are located in the vicinity of the top surface edge of the rhombic diaphragm 11 show with dotted lines in the drawing. The ends of each of the diffused resistive wires 221 to 224 are spaced apart from the ends of adjacent diffused resistive wires 221 to 224 by a slight distance. Then, sensor gauges 211 to 214, being narrow and having high resistance, are arranged in this spacing gap in the <110> orientation.

The bridge circuit pattern shown in FIG. 2 is merely a plan view of an example of a pattern configuration in order to facilitate understanding of the present invention, however, and as long as the sensor chip is formed on the (100) face of the silicon substrate, the diffused resistive wiring is arranged in the <100> orientation on the top surface of the sensor chip, the sensor gauge is arranged in the <110> orientation on the top surface of the sensor chip, the diffused resistive wiring and the sensor gauge are covered by an oxide film, and the number of contact holes for electrode line-out use does not exceed the number of sensor gauges, the arrangement pattern for the sensor gauges and the diffused resistive wiring is of course not limited to that shown in FIG. 2.

Next, a method for manufacturing the pressure sensor 1 shall be described. In manufacturing the pressure sensor 1, a known process such as that cited in paragraphs (0008) to (0012) of Japanese Unexamined Patent Application Publication No. 2000-171318 is used to form the diaphragm 11 at a predetermined location on a 300 µm-thick silicon substrate, for example. Then, as shown in FIG. 3, boron is thermally dispersed onto the (100) face of the silicon substrate, and sensor gauges 210 are formed. Next, with a method similar to that by which the sensor gauges 210 were formed, the diffused resistive wiring 220 is formed from diffused resistors. Then, the entire top of the face 100 of the silicon substrate on which these sensor gauges 210 and diffused resistive wiring 220 have been formed locally is oxidized, and the oxide film 230 is formed from an $SiO_2$ layer on the top surface. Then, contact holes 240 are formed at desired locations via a photolithographic process and etching. Next, the contacts 250 are formed. In the formation of these contacts 250, aluminum evaporation is performed to fill the contact holes 240 and form embedded parts 250a, and to form bonding-use contact pads 250b in the periphery thereof. Then, wires are bonded to the contact pads 250b as needed.

The use of this type of manufacturing process to manufacture the pressure sensor 1 of the present embodiment enables a reduction in the number of contact hole 240 areas configured from contacts 250 made of metals, the oxide film 230, and the diffused resistive wiring 220 made of semiconductor material, each of which having different coefficients of linear expansion. As a result, the pressure sensor can be made insusceptible to micro-stress from wiring and the like on the sensor. Moreover, by covering the diffused resistive wiring 220 and sensor gauges 210 with an oxide film 230, a pressure sensor having excellent environmental durability and being strongly resistant to the adhesion of dirt and contamination components can be realized.

Next, a pressure sensor 2 relating to another embodiment of the present invention shall be described. Configurations that are the same as in the above embodiment are assigned corresponding reference numerals, and a detailed explanation thereof shall be omitted.

Figure 4:
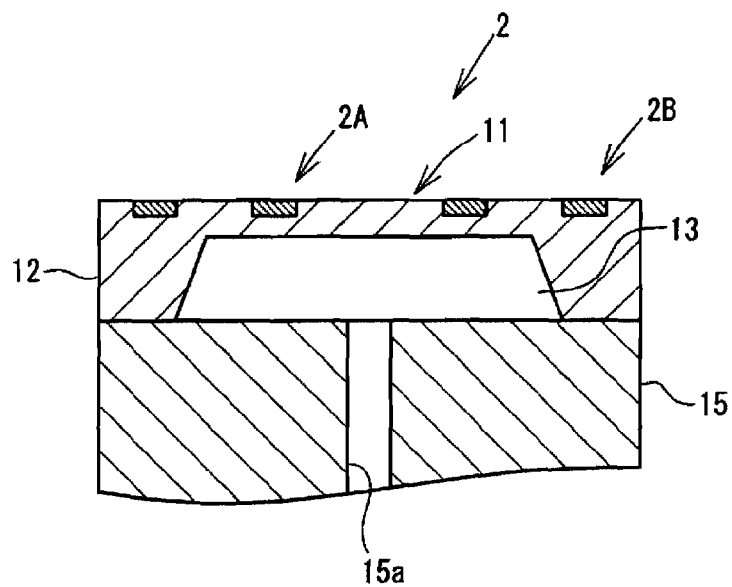
FIG. 4 is a cross-sectional view showing a simplified configuration of a pressure sensor in another embodiment of the present invention.
Figure 5:
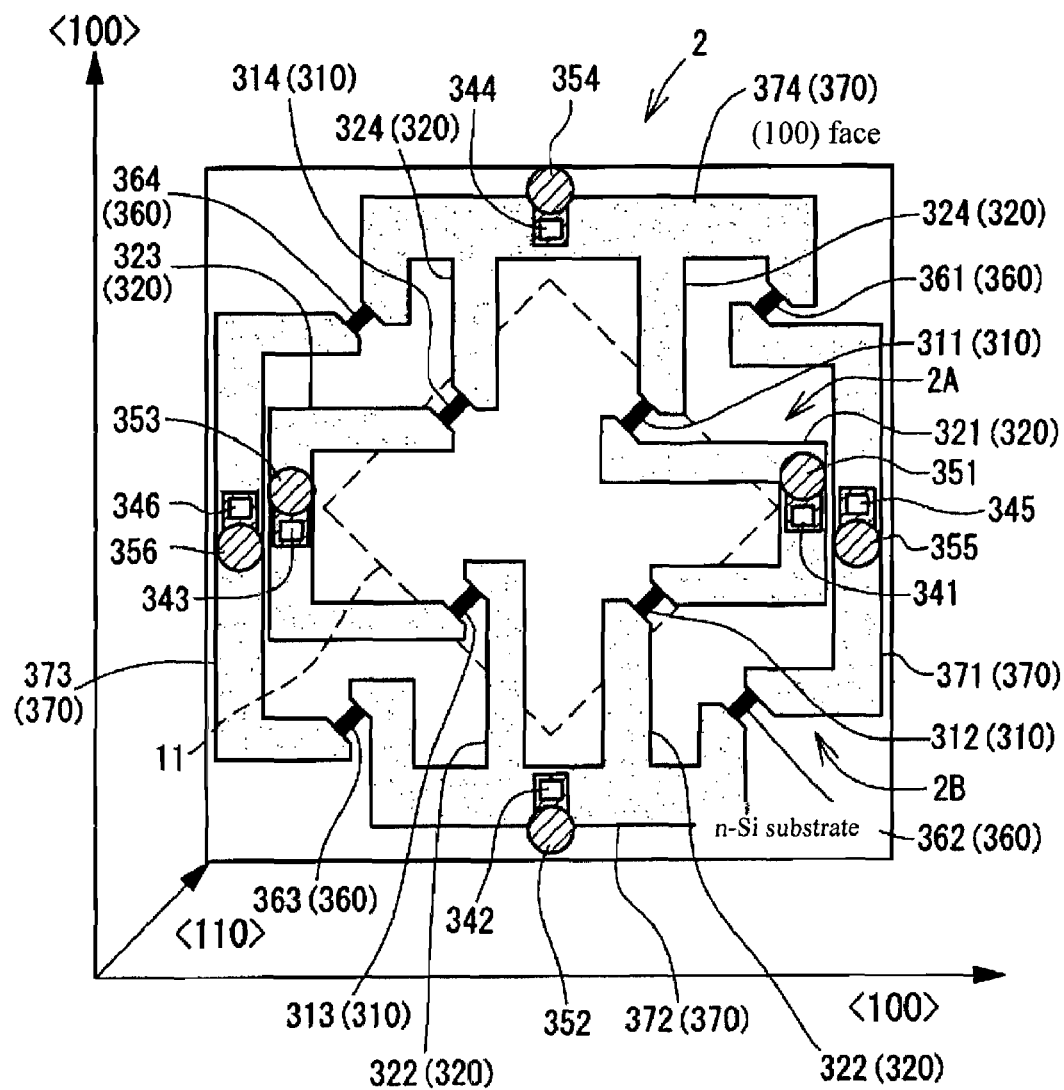
FIG. 5 is a plan view of the pressure sensor shown in FIG. 4.

As shown in FIGS. 4 and 5, the pressure sensor 2 of this embodiment is equipped with a pressure sensing part 2A having a configuration equivalent to that of the pressure sensing part equipped on the pressure sensor 1 of the above embodiment, and a pressure sensing part 2B for measuring static pressure on the top surface of the thick-walled portion 12 of the sensor chip 10. This pressure sensing part 2B for measuring static pressure has a configuration similar to that of the pressure sensing part 2A formed on the diaphragm described above. Accordingly, the static pressure applied to the pressure sensor 2 is measured with this pressure sensing part 2B, and the pressure sensor is used to correct the pressure measurement.

Specifically, four sensor gauges 310 (311 to 314) for sensing pressure are formed in the <110> orientation of the diaphragm 11 formed on the (100) face of the sensor chip, and diffused resistive wiring 320 (321 to 324) that electrically connects these four sensor ships to one another is formed on the (100) face of the sensor chip. Moreover, four sensor gauges 360 (361 to 364) for sensing static pressure are formed in the <110> orientation of the thick-walled portion 12, and diffused resistive wiring 370 (371 to 374) that electrically connects these four sensor gauges to one another is formed on the face 100 of the sensor chip.

Furthermore, the diffused resistive wiring 370 (371 to 374) for sensing static pressure is shown in FIG. 5 as having a wide irregular squared U-shape similar to that of the diffused resistive wiring 320 (321 to 324) of the pressure sensing part 2A in the drawing, and predetermined portions of the diffused resistive wiring 370 are formed with parts extending toward the diaphragm, and the actual resistance value is low. Furthermore, in the present embodiment, diffused resistive wires 371 and 322 constitute an integrated structure in which the diffused resistive wire 322 for pressure measurement-use protrudes toward the diaphragm 11 at a portion of the diffused resistive wire 372 for static pressure measurement-use, and diffused resistive wires 374 and 324 constitute an integrated structure in which the diffused wire 324 for pressure measurement-use protrudes toward the diaphragm at a portion of the diffused resistive wire 374 for static pressure measurement-use.

Then, each of contacts 352 and 354 formed corresponding to the two contact holes 342 and 344 shown at the top and bottom of the drawing configure a contact for power supply use, each of contacts 351 and 353 formed corresponding to the two contact holes 341 and 343 at the left and right interior sides of the drawing configure a contact for pressure sensing use, and contacts 355 and 356 formed corresponding to the two contact holes 345 and 346 at the left and right outer sides of the drawing indicate contacts for static pressure sensing use.

Namely, in the present embodiment, the contact holes 341 and 343 and the contacts 351 and 353 formed in correspondence thereto constitute contact holes and contacts for pressure sensing use, and the contact holes 345 and 346 and the contacts 355 and 356 formed in correspondence thereto constitute contact holes and contacts for static pressure sensing use. On the other hand, the contact holes 342 and 344 and the contacts 352 and 354 formed in correspondence thereto are used commonly as power supply contact holes and power supply contacts for pressure sensing use and for static pressure sensing use.

The above-described bridge circuit pattern of the embodiment, similarly to the bridge circuit pattern of the above embodiment, is merely a plan view of an example of a pattern configuration in order to facilitate understanding of the present invention, however, and as long as the sensor chip is formed on the face 100 of the silicon substrate, the diffused resistive wiring for both pressure measurement use and static pressure measurement use is arranged in the <100> orientation on the face 100 of the sensor chip, and the sensor gauges for both pressure measurement use and static pressure measurement use are arranged in the <110> orientation on the face 100 of the sensor chip, the arrangement pattern for the sensor gauges and the diffused resistive wiring is of course not limited to that shown in FIG. 5.

The method for manufacturing the above pressure sensor is similar to the method for manufacturing the pressure sensor of the previous embodiment, and therefore a detailed description thereof shall be omitted here.

In the pressure sensor 2 that integrates this type of pressure sensing part 2A and static pressure sensing part 2B, the above-described condition, i.e., that the number of contact holes for electrode line-out use does not exceed the number of sensor gauges, is also established. In other words, since there are eight sensor gauges and six contact holes, the number of contact holes does not exceed the total number of sensor gauges and the above-described condition is satisfied, and action and effect similar to that of the first embodiment are exhibited. Specifically, a reduction is possible in the number of contact hole 340 areas configured from contacts 350 comprised from metals, the oxide film 330, and the diffused resistive wiring 320 or the diffused resistive wiring 370 made from semiconductor material, each of which having different coefficients of linear expansion. As a result, the pressure sensor can be made insusceptible to micro-stress from wiring and the like on the sensor. Moreover, by covering the diffused resistive wiring 320 and 370 and the sensor gauges 310 and 360 with an oxide film, a pressure sensor having excellent environmental durability can be realized.

Evaluation testing was performed to confirm the particular action and effect of the present invention compared to a conventional example, and these evaluation test results are described below.

Figure 6:
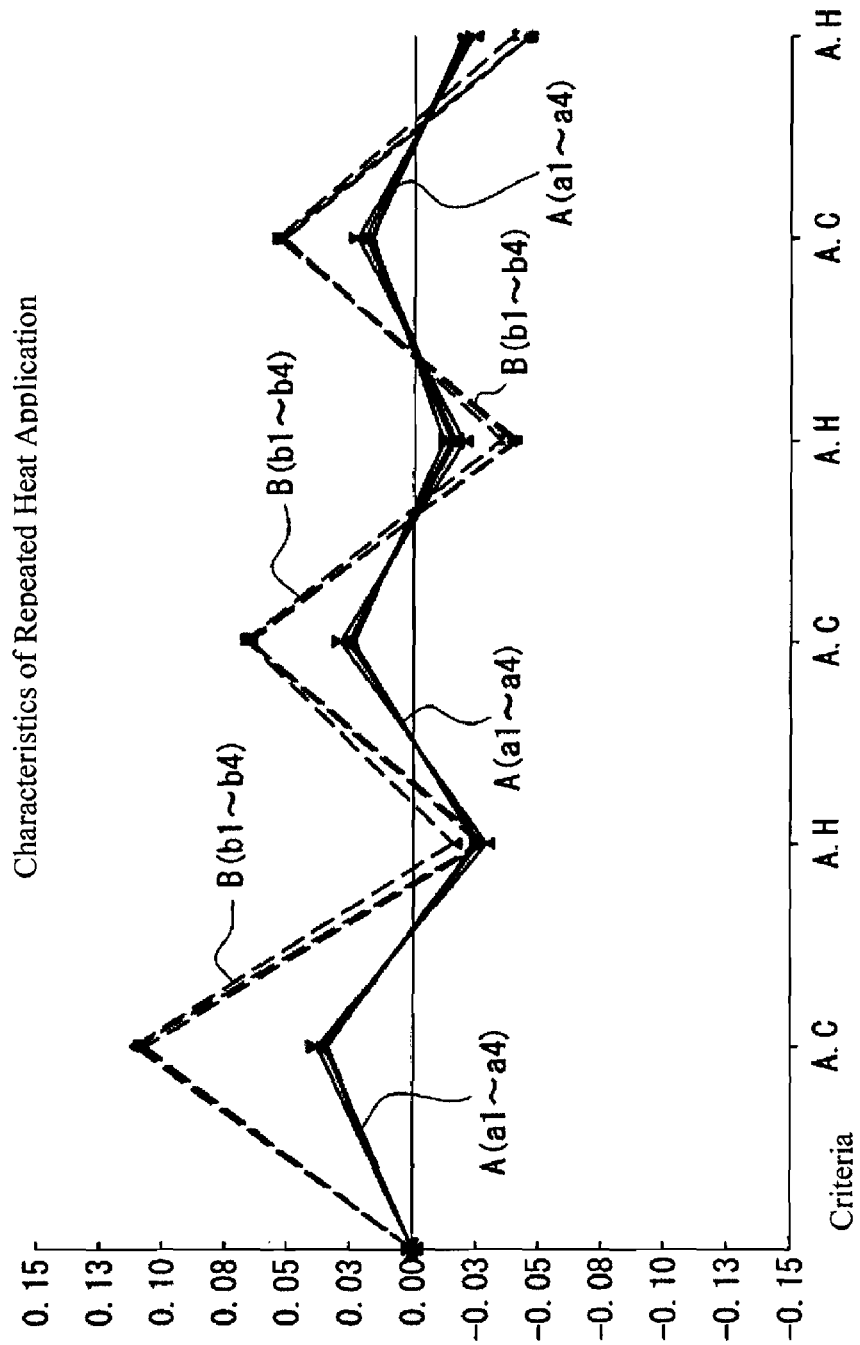
FIG. 6 is an output characteristics chart showing evaluation test results of the present example of the second embodiment and a comparative example.

FIG. 6 shows the evaluation test results of the repeated output characteristics of the pressure sensor in a thermal cycle application test known as a thermal hysteresis comparison. Here, the horizontal axis shows the time at which heat and cold were repeatedly applied, and the vertical axis shows the pressure sensor output corresponding to the heating characteristic curve of the horizontal axis while in the state where a constant pressure being applied. In the chart, output characteristics of the conventional type pressure sensor (hereafter referred to as the "comparative example"), having been measured four times, are shown as B (b1 to b4), and output characteristics of the pressure sensor in the above-described second embodiment of the present invention (hereafter referred to as "the present embodiment"), having been measured four times, are shown as A (a1 to a4).

This chart of thermal hysteresis characteristics reveals that, in contrast to the considerable output fluctuation that tracks temperature changes of the comparative example, the present embodiment is not as susceptible to the affect of temperature changes within a fixed output range and exhibits stable output characteristics.

As described above, the pressure sensor of the present invention comprises a diaphragm formed at a predetermined location of a sensor chip made of semiconductor material, and a sensor gauge for differential pressure or pressure sensing-use provided on the sensor chip that includes at least the diaphragm; wherein the sensor gauge comprises a plurality of sensor gauges synergistically forming a bridge circuit, the sensor gauges being connected to one another with semiconductor resistors, and the semiconductor resistors and the sensor gauges being covered with an insulating film, and the number of contact holes, passing through a portion of the oxide film, for electrode line-out use for forming contacts electrically connected to the semiconductor resistors does not exceed the number of sensor gauges. As a result, the pressure sensor can be made insusceptible to micro-stress from wiring and other stresses on the sensor. Moreover, by covering the semiconductor resistors and sensor gauges with an insulating film, a pressure sensor having excellent environmental durability can be realized.

Moreover, preferably, in the pressure sensor of the present invention, the sensor chip is made from silicon, with the sensor chip being formed on the (100) face, the sensor gauges being formed in the <110> orientation, and the semiconductor resistors being formed in the <100> orientation, thereby enabling the realization of a pressure sensor having high pressure sensitivity, insusceptibility to micro-stress from wiring and the like on the sensor, and excellent environmental durability.

What is claimed is:

1. A pressure sensor comprising:
   a sensor chip made of semiconductor silicon and formed on the (100) face;
   a diaphragm formed at a predetermined location on the face of the sensor chip, and
   a sensor gauge sensing at least one of direct pressure or a differential pressure provided on the sensor chip that includes at least the diaphragm, and is formed in the <110> orientation;
   wherein the sensor gauge comprises a plurality of sensor gauges synergistically forming a bridge circuit, the sensor gauges being connected to one another with semiconductor resistors, and the semiconductor resistors and the sensor gauges being covered with an insulating film,
   wherein the semiconductor resistors being formed in the <100> orientation, and
   wherein the number of contact holes, passing through a portion of the insulating film, for electrode line-out use for forming contacts electrically connected to the semiconductor resistors does not exceed the number of sensor gauges.

* * * * *